United States Patent
Lee et al.

(10) Patent No.: US 8,111,248 B2
(45) Date of Patent: Feb. 7, 2012

(54) LIQUID CRYSTAL DISPLAY DEVICE AND METHOD OF MANUFACTURING THEREOF

(75) Inventors: Deuk Su Lee, Yongin-si (KR); In Hyuk Song, Gwanak-gu (KR); Hyung Seok Park, Gangseo-gu (KR)

(73) Assignee: LG Display Co., Ltd., Seoul (KR)

( * ) Notice: Subject to any disclaimer, the term of this patent is extended or adjusted under 35 U.S.C. 154(b) by 602 days.

(21) Appl. No.: 12/292,550

(22) Filed: Nov. 20, 2008

(65) Prior Publication Data

US 2010/0066702 A1     Mar. 18, 2010

(30) Foreign Application Priority Data

Sep. 12, 2008   (KR) ................. 10-2008-0090237

(51) Int. Cl.
   *G06F 3/041*     (2006.01)
(52) U.S. Cl. ............. 345/174; 345/173; 345/50; 345/55
(58) Field of Classification Search .................. None
   See application file for complete search history.

(56) References Cited

U.S. PATENT DOCUMENTS

| | | |
|---|---|---|
| 2008/0055270 A1 | 3/2008 | Cho et al. |
| 2009/0159344 A1* | 6/2009 | Hotelling et al. .......... 178/18.06 |

FOREIGN PATENT DOCUMENTS

| | | |
|---|---|---|
| CN | 1754141 | 3/2006 |
| CN | 1851534 | 10/2006 |
| KR | 10-2008-0021928 | 3/2008 |

* cited by examiner

*Primary Examiner* — Muhammad N Edun
(74) *Attorney, Agent, or Firm* — McKenna Long & Aldridge, LLP (57) ABSTRACT

A liquid crystal display device includes: a liquid crystal panel including first and second substrates facing each other and a liquid crystal layer between the first and second substrates, each of the first and second substrates defining a central display region and a peripheral non-display region; a cover glass integrated touch sensor on the liquid crystal panel, the touch sensor including a plurality of transparent first electrodes and second electrodes formed on a surface of the cover glass facing the liquid crystal panel, wherein the first electrodes and second electrodes cross each other; and a touch signal applicator at a side of the cover glass away from the display region of the liquid crystal panel.

20 Claims, 9 Drawing Sheets

RELATED ART

LIQUID CRYSTAL DISPLAY DEVICE AND METHOD OF MANUFACTURING THEREOF

This application claims the benefit of the Korean Patent Application No. P08-090237, filed on Sep. 12, 2008, which is hereby incorporated by reference for all purposes as if fully set forth herein.

BACKGROUND OF THE INVENTION

1. Field of the Invention

The present invention relates to a liquid crystal display device, and more particularly, to a liquid crystal display device, wherein a touch panel is provided at a surface of a cover glass.

2. Discussion of the Related Art

Recently, as society becomes increasingly information dependent, a display field, wherein electrical information signals are visually displayed, has been developed rapidly. A variety of flat panel display devices having outstanding performances, such as a thin thickness, light weight and low electricity consumption, have been developed and have rapidly replaced conventional Cathode Ray Tubes (CRTs).

Examples of flat panel display devices include Liquid Crystal Display (LCD), Plasma Panel Display (PDP), Field Emission Display (FED), Electro-Luminescence Display (ELD) devices. These devices commonly include, as an essential constituent element, a flat display panel to form an image. The flat display panel is configured such that a pair of transparent insulating substrates is bonded to face each other with an illuminating or polarizing material layer interposed therebetween.

Of the above-mentioned display devices, LCD devices are designed to display an image by adjusting light transmissivity of liquid crystals using an electric field. LCD devices may include a display panel having liquid crystal cells, a backlight unit to irradiate light to the display panel, and drive circuits to drive the liquid crystal cells.

The display panel may be provided with a plurality of gate lines and a plurality of data lines, which cross each other to define a plurality of unit pixel regions. Each pixel region may include a thin-film transistor array substrate and color filter array substrate opposite each other, spacers located between the two substrates to maintain a cell gap, and liquid crystals filled in the cell gap.

The thin-film transistor array substrate may include the gate lines and data lines, thin-film transistors as switching devices formed at crossings of the gate lines and data lines, pixel electrodes arranged on a per liquid crystal cell basis and connected to the thin-film transistors, and an alignment film coated over all the above elements. The drive circuits may supply signals to the gate lines and data lines through respective pads.

The thin-film transistors may supply pixel voltage signals, supplied to the data lines in response to scan signals supplied to the gate lines, to the pixel electrodes.

The color filter array substrate may include color filters arranged on a per liquid crystal cell basis, a black matrix for division of the color filters and refraction of outside light, a common electrode commonly supplying a reference voltage to the liquid crystal cells, and an alignment film coated over all the above elements.

After the thin-film transistor substrate and color filter array substrate, which are fabricated separately, are aligned, the thin-film transistor substrate and color filter array substrate are bonded to face each other, and liquid crystals may be injected and sealed, to thereby complete the display panel.

Recently, demand for addition of a touch panels to LCD devices fabricated as described above is increasing. A touch panel senses a touch position of person's hand or other input means and transmits information in response to the sensed touch position. Currently, touch panels have been attached to an outer surface of the LCD device.

Hereinafter, a related art touch panel attached LCD device will be described with reference to the accompanying drawing.

Figure 1:
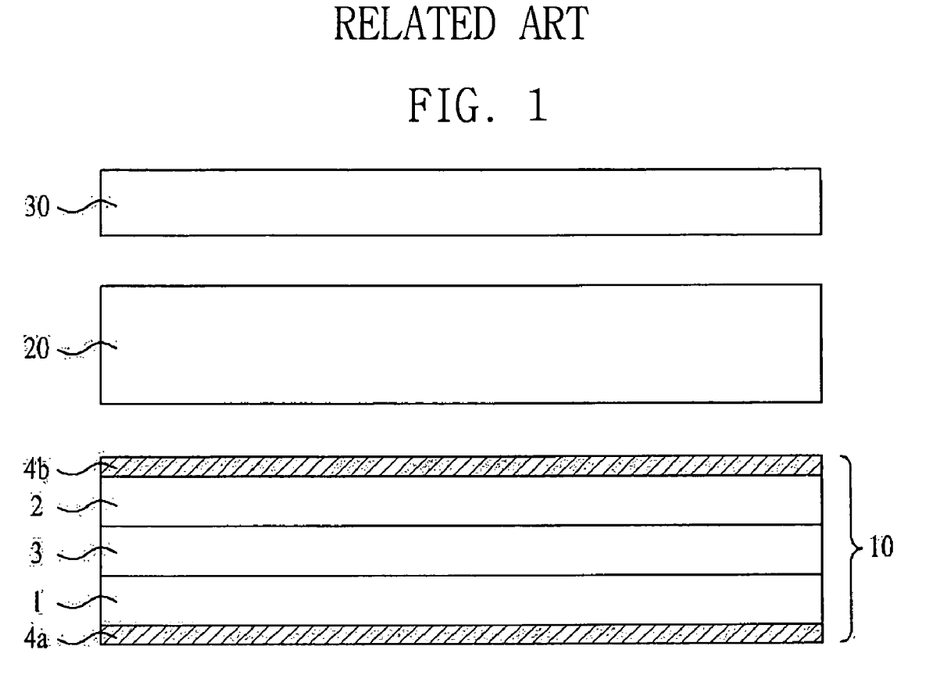
FIG. 1 is a schematic view illustrating a related art liquid crystal display device.

FIG. 1 is a schematic view illustrating a touch panel attached LCD device.

As shown in FIG. 1, touch panel attached LCD device includes a liquid crystal panel 10 which includes first and second substrates 1 and 2, a liquid crystal layer 3 filled between the substrates 1 and 2 and first and second polarizers 4a and 4b attached to rear surfaces of the first and second substrates 1 and 2, respectively, a touch panel 20 which is placed on the liquid crystal panel 10 and is driven in a capacitive manner, and a cover glass 30 to protect the top of the touch panel 20.

Provided on the first substrate 1 of the liquid crystal panel 10 is a Thin-Film-Transistor (TFT) array including gate lines and data lines intersecting each other to define pixel regions, TFTs formed at intersections of the gate lines and data lines, and pixel electrodes in the respective pixel regions.

Provided on the second substrate 2 is a color filter array including a black matrix layer, a color filter layer and a common electrode.

The interior configuration of the touch panel 20 is changed according to a driving manner of the touch panel. For example, in the case of a capacitive touch panel designed to sense a touch position via a capacitance variation at a touch point, first and second electrodes intersecting each other are provided to enable sensing via a capacitance value variation between the electrodes.

To protect the touch panel 20, the cover glass 30 is provided on the top of the touch panel 20.

The above-described touch panel attached LCD device requires adhesive layers between the touch panel 20 and the liquid crystal panel 10 and between the touch panel 20 and the cover glass 30. In this case, the touch panel 20 and cover glass 30 are separately provided above the liquid crystal panel 10. There is a need for a processes for adhering the touch panel 20 and the liquid crystal panel 10 to each other and a process for adhering the cover glass 30 and the touch panel 20 to each other.

Now, problems of the above-described touch panel attached LCD device will be described.

The touch panel is provided as a sheath of the liquid crystal panel, together with the cover glass provided to protect the touch panel, and adhesive layers must be provided between the touch panel and the liquid crystal panel and between the cover glass and the touch panel. This inevitably entails additional attachment processes. Furthermore, since related art touch panels have at least two opposing substrates and two crossing electrodes, it takes many processes to make the related art touch panel attached LCD device. Further, if the touch panel and liquid crystal panel are misaligned, it is difficult to separate the touch panel attached to the liquid crystal panel because the cover glass is applied after attaching the touch panel to the liquid crystal panel, and forcible separation may damage the touch panel.

SUMMARY OF THE INVENTION

Accordingly, the present invention is directed to a liquid crystal display device that substantially obviates one or more problems due to limitations and disadvantages of the related art.

An object of the present invention is to reduce the number of processes and facilitate assembling of a liquid crystal display device, wherein a touch panel is provided at a surface of a cover glass.

Another object of the present invention is to provide a liquid crystal display device, wherein a touch panel is provided at a surface of a cover glass, having minimized structure.

Another object of the present invention is to provide a liquid crystal display device, wherein a touch panel is provided at a surface of a cover glass, wherein misalignment may be partially prevented when bonding the cover glass and the liquid crystal panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a liquid crystal panel including first and second substrates facing each other and a liquid crystal layer between the first and second substrates, each of the first and second substrates defining a central display region and a peripheral non-display region; a cover glass integrated touch sensor on the liquid crystal panel, the touch sensor including a plurality of transparent first electrodes and second electrodes formed on a surface of the cover glass facing the liquid crystal panel, wherein the first electrodes and second electrodes cross each other; and a touch signal applicator at a side of the cover glass away from the display region of the liquid crystal panel.

In another aspect of the present invention, a method of manufacturing a liquid crystal display device includes: forming a liquid crystal panel including first and second substrates facing each other and a liquid crystal layer between the first and second substrates, each of the first and second substrates defining a central display region and a peripheral non-display region; forming a cover glass integrated touch sensor, the touch sensor including a plurality of transparent first electrodes and second electrodes formed on a surface of the cover glass facing the liquid crystal panel, wherein the first electrodes and second electrodes cross each other; bonding the liquid crystal panel to the cover glass integrated touch sensor; and forming a touch signal applicator at a side of the cover glass away from the display region of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, example of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 2:
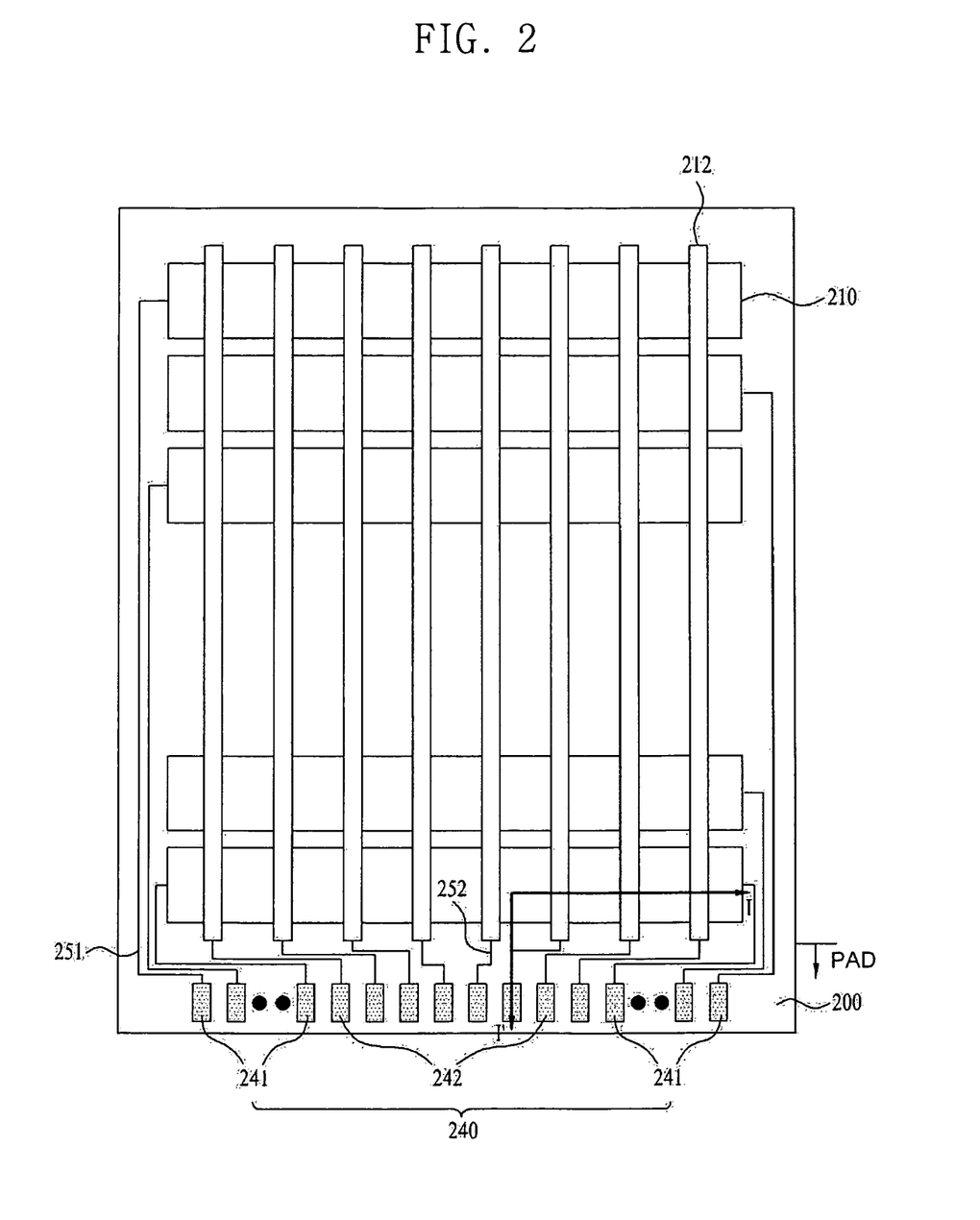
FIG. 2 is a plan view illustrating an interior of a cover glass integrated touch sensor provided in a liquid crystal display device according to an embodiment the present invention.
Figure 3:
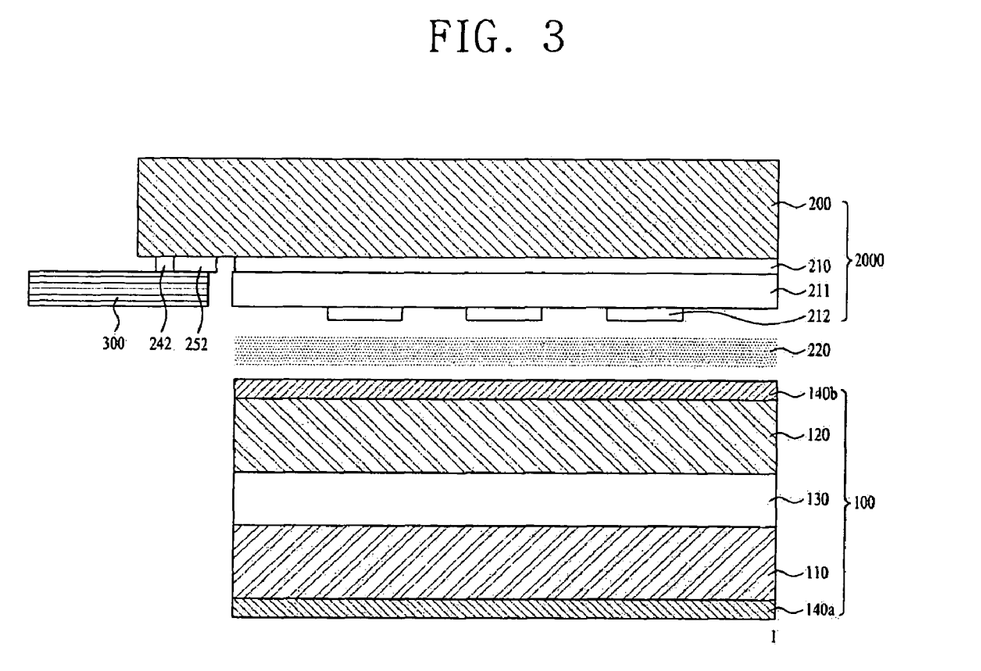
FIG. 3 is a sectional view taken along line I-I' of FIG. 2.

FIG. 2 is a plan view illustrating the interior of a cover glass provided in a liquid crystal display device. FIG. 3 is a sectional view taken along line I-I' of FIG. 2, illustrating the a configuration of the liquid crystal display device.

As shown in FIGS. 2 and 3, the liquid crystal display device includes a cover glass integrated touch sensor 2000 and a liquid crystal panel 100 bonded to each other via an adhesive layer 220. The cover glass integrated touch sensor 2000 includes X electrodes 210 and Y electrodes 212 for touch sensing provided at an inner surface of a cover glass 200 facing the liquid crystal panel, and an insulating film 211 between the X electrodes 210 and the Y electrodes 212. Instead of providing a touch panel as in the related art, a touch sensor in the form of an array is provided at the inner surface of the cover glass 200, which generally protects the liquid crystal display device from external pressure and stimulations.

As shown the liquid crystal panel 100 includes first and second substrates 110 and 120 opposite each other, and a liquid crystal layer 130 filled between the substrates 110 and 120. First and second polarizers 140a and 140b are provided at rear surfaces of the first and second substrates 110 and 120, respectively.

Although not shown, a thin film transistor array may be provided on the first substrate 110, including gate lines and data lines crossing each other to define pixel regions, thin film transistors formed at crossings of the gate lines and data lines, and pixel electrodes in the respective pixel regions. A color filter array, which includes a black matrix layer, a color filter layer and a common electrode, is may be provided on the second substrate 120.

The common electrode may be formed over the entire surface of the second substrate 120, and as occasion demands, a plurality of common electrodes may be formed alternately with the pixel electrodes in the pixel regions of the first substrate 110. Selection of electrode configuration depends on a Twisted Nematic (TN) mode or In-Plane Switching (IPS) mode required for a liquid crystal panel.

The cover glass 200 is extended slightly longer than the liquid crystal panel 100 such that an extended protruding portion of the cover glass 200 defines a pad part. The pad part includes a plurality of pads 242 to apply signals to the respective X and Y electrodes 210 and 212. The plurality of pads 242 is connected with the respective X and Y electrodes 210 and 212 through lines 252.

The plurality of pads 242 is further connected with a touch signal applicator 300 via, for example, soldering. The touch signal applicator 300 may be made of a soft Flexible Printed Cable (FPC).

Figure 4:
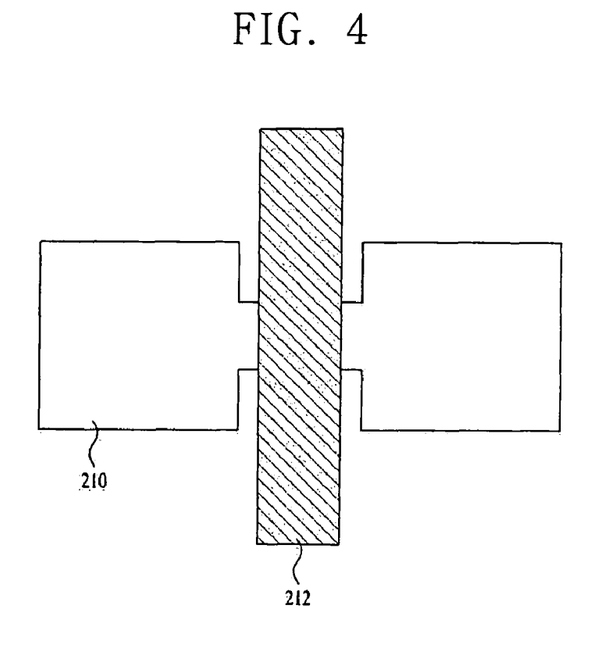
FIG. 4 is an enlarged plan view illustrating a crossing of X and Y electrodes provided in a liquid crystal display device according to the an embodiment of the present invention.

FIG. 4 is an enlarged plan view illustrating a crossing of the X and Y electrodes.

As shown in FIG. 4 in an enlarged view of the intersection of the X and Y electrodes 210 and 212, the X-electrode 210 is reduced in width at a region overlapped with the Y electrode 212, rather than having a constant width.

In the liquid crystal display device, a touch position is may be sensed by detecting a capacitance variation between the X electrode 210 and the Y electrode 212 at a touch point. In this case, if a crossing of the X electrode 210 and Y electrode 212 has a large area, detection of the capacitance variation may be difficult due to an increased load in the intersection. To solve this problem, the width of the X electrode 210 is relatively reduced at the intersection of the X electrode 210 and Y electrode 212. Although the reduced width of the X electrode 210 is illustrated, as occasion demands, the width of the Y electrode 212 may be reduced, or both the widths of the two electrodes may be reduced.

Figure 5:
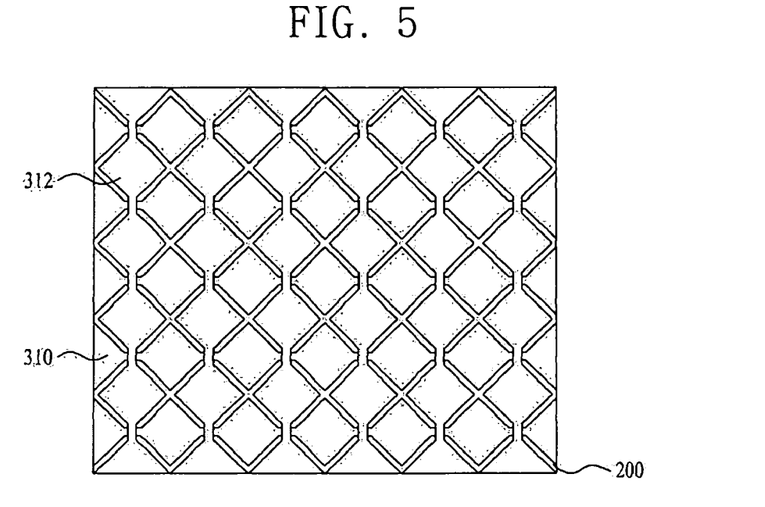
FIG. 5 is a plan view illustrating a modified form of X and Y electrodes in a liquid crystal display device according to an embodiment of the present invention.

FIG. 5 is a plan view illustrating a modified form of X and Y electrodes.

In FIG. 5, an X electrode 310 and a Y electrode 312 have the same area and are reduced in width at a crossing thereof, to minimize the occurrence of a load upon detection of a capacitance. Although the X and Y electrodes 310 and 312 are illustrated to have a diamond shape, other modified shapes are also possible if the X electrode 310 and Y electrode 312 occupy the same area on the cover glass 200.

Figure 6:
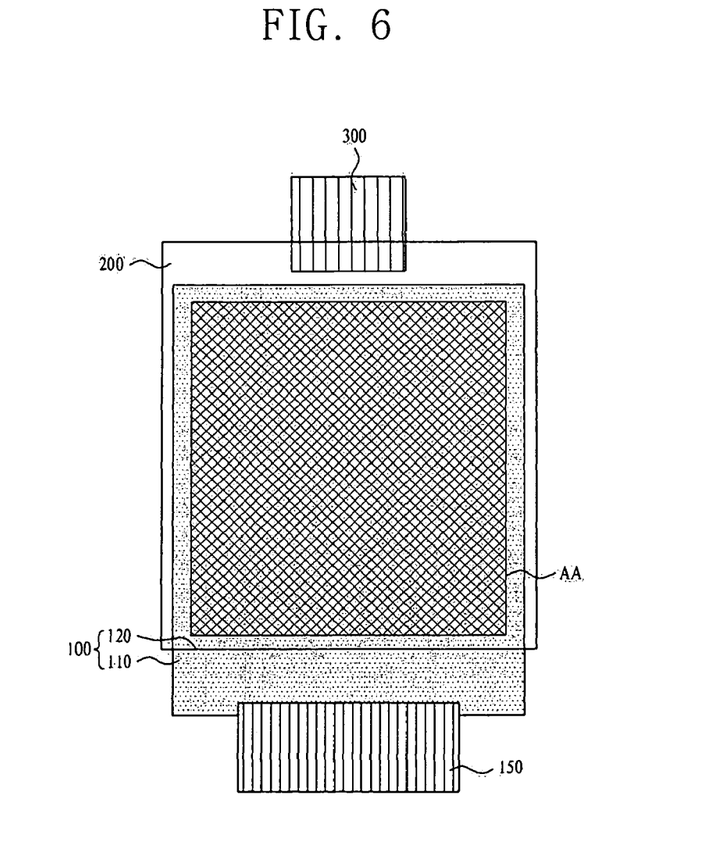
FIG. 6 is a plan view illustrating a cover glass integrated touch sensor and liquid crystal panel attached to each other and a touch signal applicator and image signal applicator connected to the cover glass and liquid crystal panel, respectively, in the liquid crystal display device according to an embodiment of the present invention.

FIG. 6 is a plan view illustrating a cover glass integrated touch sensor and liquid crystal panel attached to each other, and a touch signal applicator and an image signal applicator connected to the cover glass and liquid crystal panel, respectively.

As shown in FIG. 6, a cover glass 200 is attached, via an adhesive layer (220, See FIG. 3), to a liquid crystal panel 100 wherein first and second substrates 110 and 120 are bonded to each other with a liquid crystal layer (not shown) interposed therebetween.

Considering the liquid crystal panel 100, the first substrate 110 is further extended than the second substrate 120 to protrude from the second substrate 120. Defining a the protruding region as a first region, the first region is provided with pad electrodes (not shown) to apply signals to the gate lines (not shown) and data lines (not shown) provided on the first substrate 110. The pad electrodes are connected with the respective gate lines and data lines and also, are connected with an external image signal applicator 150 via, for example, soldering. As shown, the pad electrodes of the gate lines and data lines are provided in a side region of the liquid crystal panel 100 (i.e. the first region shown in the bottom of the drawing). In this case, the gate lines are indirectly connected to the respective pad electrodes via vertical connecting lines provided at opposite sides of the gate lines and horizontal connecting lines connected with the vertical connecting lines.

Of an overlap region of the first and second substrates 110 and 120, a central display region is called an active region AA.

The cover glass 200 includes a second region protruding from the liquid crystal panel 100. The second region of the cover glass 200 is provided with pad electrodes (not shown) to apply signals to the X and Y electrodes, and the touch signal applicator 300 connected with the pad electrodes via, for example, soldering.

Although the above description illustrates the cover glass 200 as including the second region not overlapped with the liquid crystal panel 100 for connection of the touch signal applicator 300, the pad electrode region of the cover glass 200 may overlap with the outer rim of the active region AA of the liquid crystal panel 100, thereby minimizing the second region protruding from the liquid crystal panel 100.

Each of the image signal applicator 150 and touch signal applicator 300 is may be made of a soft FPC. When being assembled to a liquid crystal module, these applicators are may be foldable to an underside of the liquid crystal panel 100.

Hereinafter, another arrangement of the second region of the cover glass 200 configured as described above will be described.

Figure 7A:
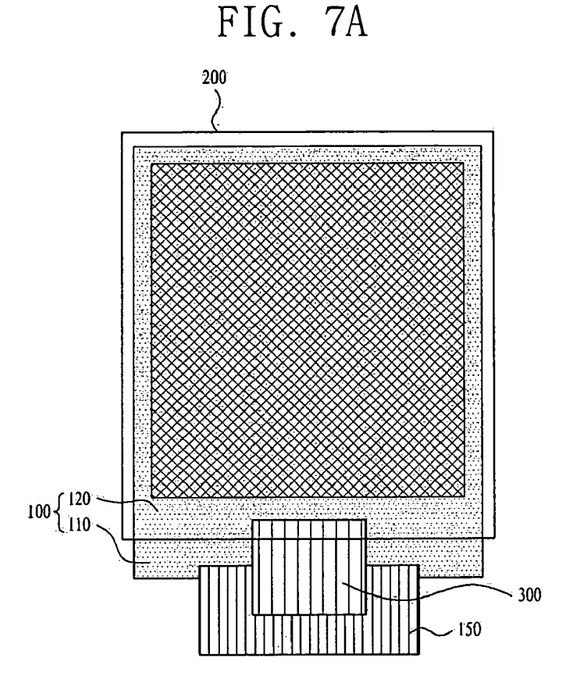
FIGS. 7A to 7C are plan views illustrating different examples of connection of the touch signal applicator in the liquid crystal display device according to embodiments of the present invention.
Figure 7B:
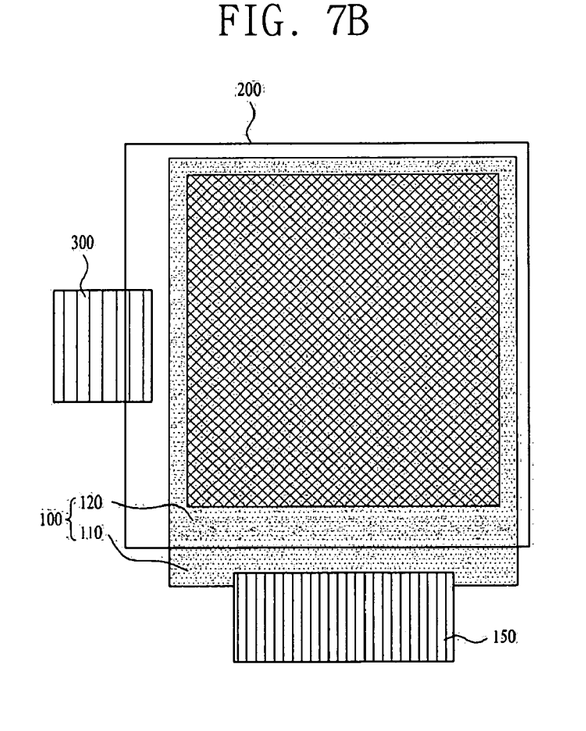
Figure 7C:
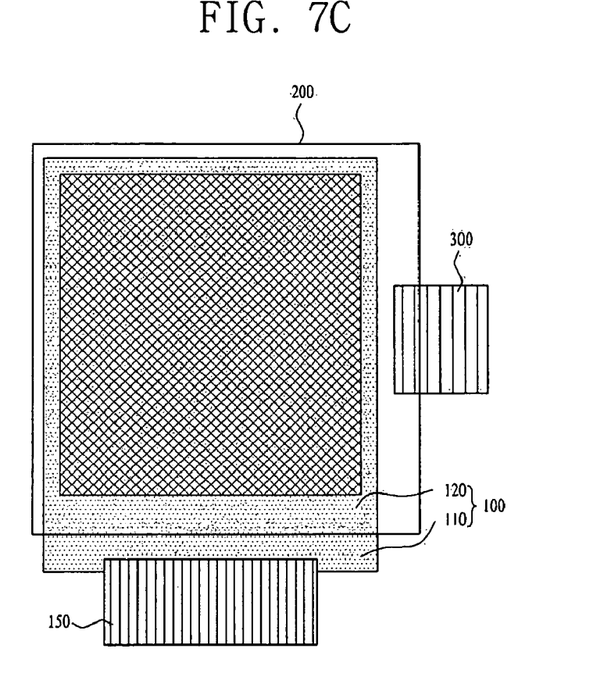

FIGS. 7A to 7C are plan views illustrating different examples of connection of the touch signal applicator.

FIG. 7A illustrates that the touch signal applicator 300 is connected to the touch sensor at the lower side of the cover glass 200, FIG. 7B illustrates that the touch signal applicator 300 is connected to the touch sensor at the left side of the cover glass 200, and FIG. 7C illustrates that the touch signal applicator 300 is connected to the touch sensor at the right side of the cover glass 200. In such a manner, the touch signal applicator 300 can be connected to different positions of the cover glass 200.

In the case of FIG. 7A, although the touch signal applicator 300 partially overlaps with the image signal applicator 150 that is used to apply image signals to the liquid crystal panel 100, lines of the respective applicators 300 and 150 are located at opposite surfaces, rather than at facing surfaces. Therefore, there is no risk of shorts between the metal lines. That is, in FIG. 7A, the touch signal applicator 300 connected with the cover glass 200 has metal lines connected to the pad electrodes formed at the inner surface of the cover glass 200 via, for example, soldering. The metal lines are located on a visible front surface of the drawing. The image signal applicator 150 connected with the liquid crystal panel 100 is provided at a rear surface thereof (an invisible rear surface of the drawing) with metal lines such that the metal lines are connected to the respective gate line pad electrodes and data line pad electrodes of the liquid crystal panel 100. Accordingly, the metal lines of the touch signal applicator 300 and image signal applicator 150 are arranged at opposite surfaces so as not to face each other, eliminating any risk of shorts.

From the viewpoint of the cover glass 200, the configuration of FIG. 7A is advantageous in terms of integration because the cover glass 200 can minimize or omit any protruding region thereof from the liquid crystal panel 100. However, the position of the touch signal applicator 300 may be limited in consideration of a relationship with a light source or circuit board located below the liquid crystal panel 100 and therefore, is determined in consideration of the lower configuration and advantages of optimization.

FIGS. 7B and 7C illustrate that the touch signal applicator 300 is located at the left side or right side of the liquid crystal panel 100. On the basis of the configuration shown in FIG. 7A, any configuration of FIGS. 6, 7B and 7C can be selected to prevent electrical interference between the image signal applicator 150 and the touch signal applicator 300.

The following description is related to an embodiment for minimizing a crossing of X and Y electrodes in consideration of a touch sensing error caused when a considerable load occurs at the intersection of X and Y electrodes.

Figure 8A:
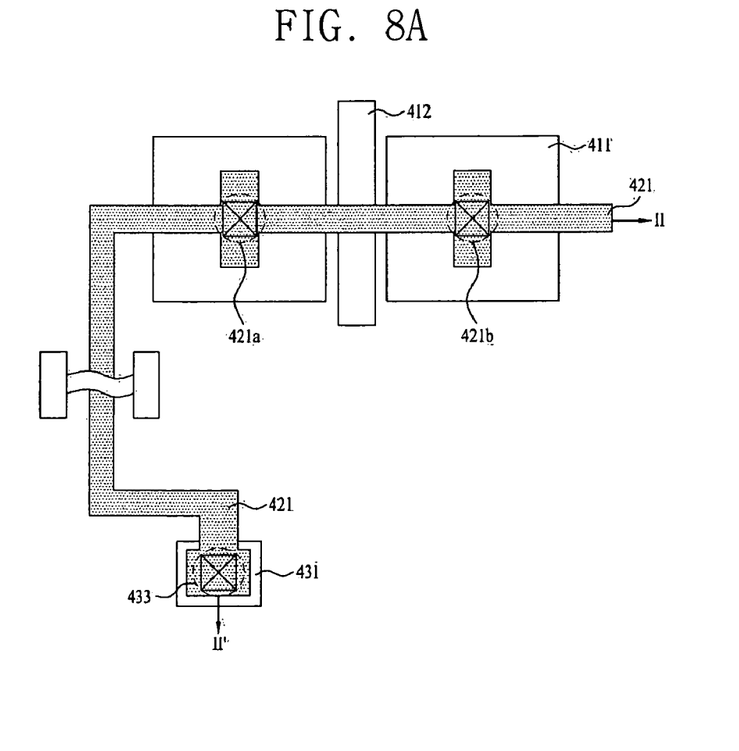
FIGS. 8A and 8B are a plan view and a sectional view, respectively, illustrating an embodiment of the present invention wherein X and Y electrodes are arranged in the same layer in the liquid crystal display device.
Figure 8B:
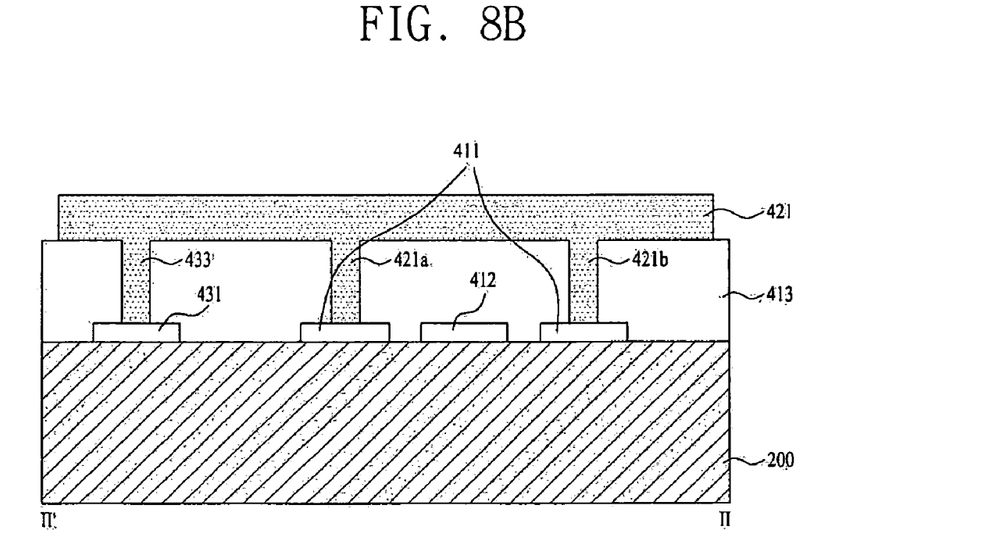

FIGS. 8A and 8B are a plan view and a sectional view, respectively, illustrating an embodiment wherein X and Y electrodes are arranged in the same layer.

In the embodiment shown in FIG. 8A, instead of the bar-shaped X and Y electrodes of FIGS. 2 and 4, a plurality of island-shaped X electrodes 411 of each X-axis row is linearly spaced apart from one another in an X-axis direction, and a bar-shaped Y electrode 412 is interposed between the respective neighboring electrodes 411 to pass in a Y-axis direction.

The X electrodes 411 and Y electrodes 412 are transparent electrodes and may be made of any one of Indium Tin Oxide (ITO), Indium Zinc Oxide (IZO) and Indium Tin Zinc Oxide (ITZO).

The Y electrode 412 is lengthened in a Y-axis direction and a pad electrode is provided at one end of the Y electrode 412.

As shown in FIG. 8B, a transparent insulating film 413 is formed over the X electrodes 411 and in turn, an X electrode signal applying line 421 is formed on the transparent insulating film 413 to cross the X electrodes 411 of each row spaced apart from one another. The X electrode signal applying line 421 is electrically connected with the X electrodes 411 through contact holes 421a and 421b perforated in the transparent insulating film 413.

The X electrode signal applying line 421 is formed per each row of the X-electrodes 411, and is connected with a single pad electrode 431 through a pad contact hole 433.

The X electrode signal applying line 421 may be made of metal. In this case, to prevent a reduction in opening ratio, the X electrode signal applying line 421 is formed at a position corresponding to the black matrix layer which is formed on the second substrate 120 of the liquid crystal panel 100.

Figure 9A:
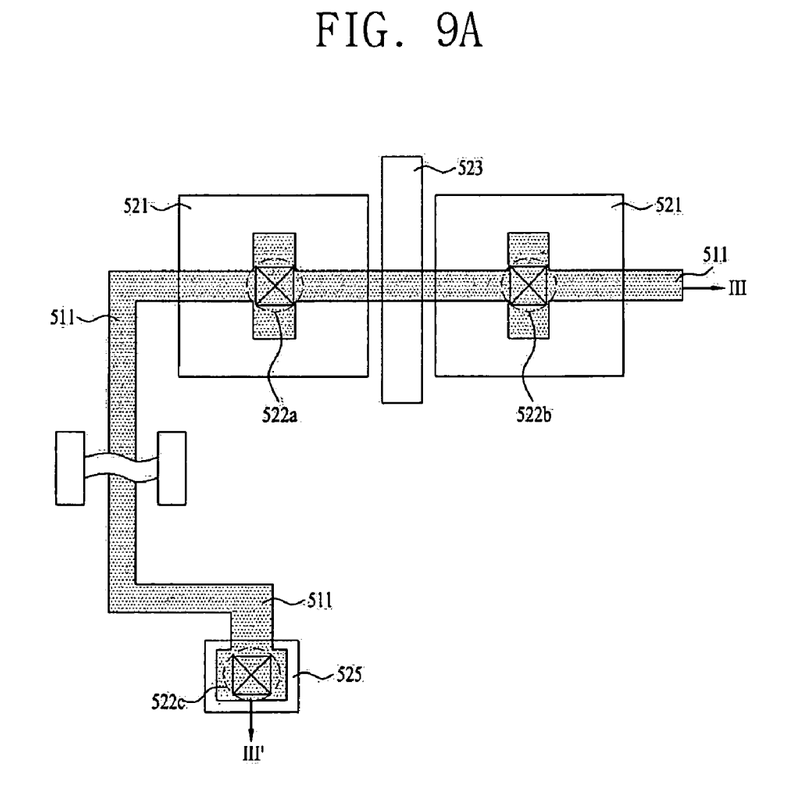
FIGS. 9A and 9B are a plan view and a sectional view, respectively, illustrating an alternative embodiment of the present invention wherein X and Y electrodes are arranged in the same layer.
Figure 9B:
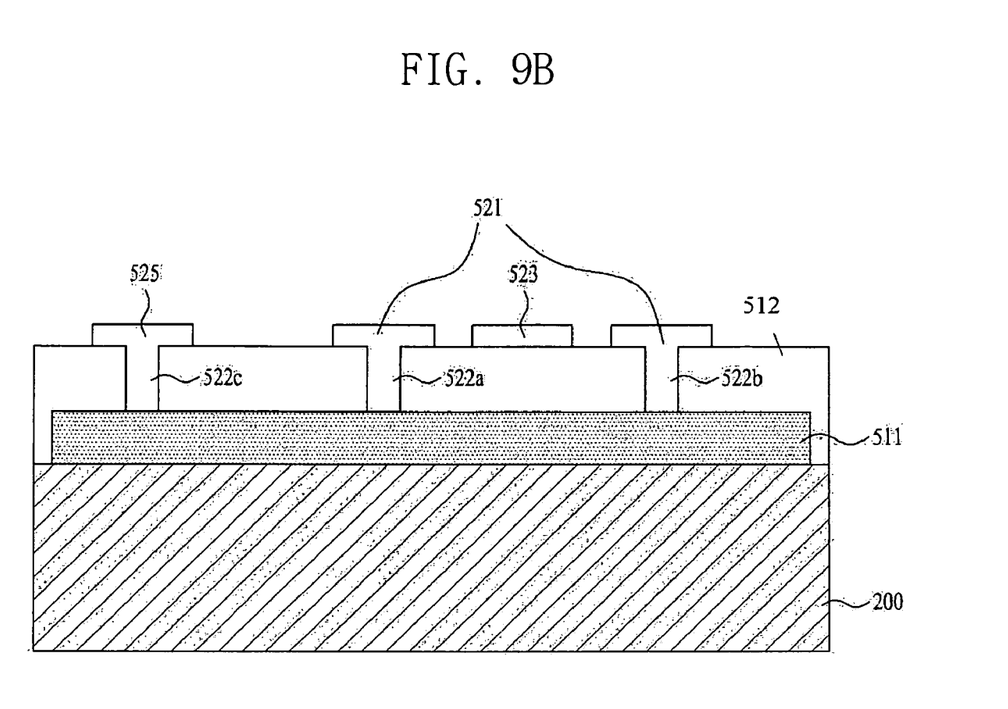

FIGS. 9A and 9B are a plan view and a sectional view, respectively, illustrating a modified embodiment wherein X and Y electrodes are arranged in the same layer.

As compared to the configuration of FIGS. 8A and 8B, in FIGS. 9A and 9B, an X electrode signal applying line 511 is located below X and Y electrodes 521 and 523 which are formed to transparent electrodes. A transparent insulating film 512 is formed on the X electrode signal applying line 511 and in turn, the X and Y electrodes 521 and 523 spaced apart from each other are formed on the transparent insulating film 512. In this case, when viewed in plan, the shapes of the X electrodes 521 and Y electrodes 523 are identical to FIG. 8A, and only the positional relationship is inverted.

Here, the X electrodes 521 of each row are electrically connected with the X electrode signal applying line 511 through contact holes 522a and 522b perforated in the transparent insulating film 512. A pad electrode 525 as a transparent electrode is further formed in the same layer as the X electrodes 521 and overlaps with one end of the X electrode signal applying line 511. The pad electrode 525 is electrically connected with the end of the X electrode signal applying line 511 located therebelow through a pad contact hole 522c.

Although FIGS. 8A and 9A illustrate the island-shaped X electrodes and bar-shaped Y electrodes, the X electrodes and Y electrodes may have a diamond shape.

Figure 9C:
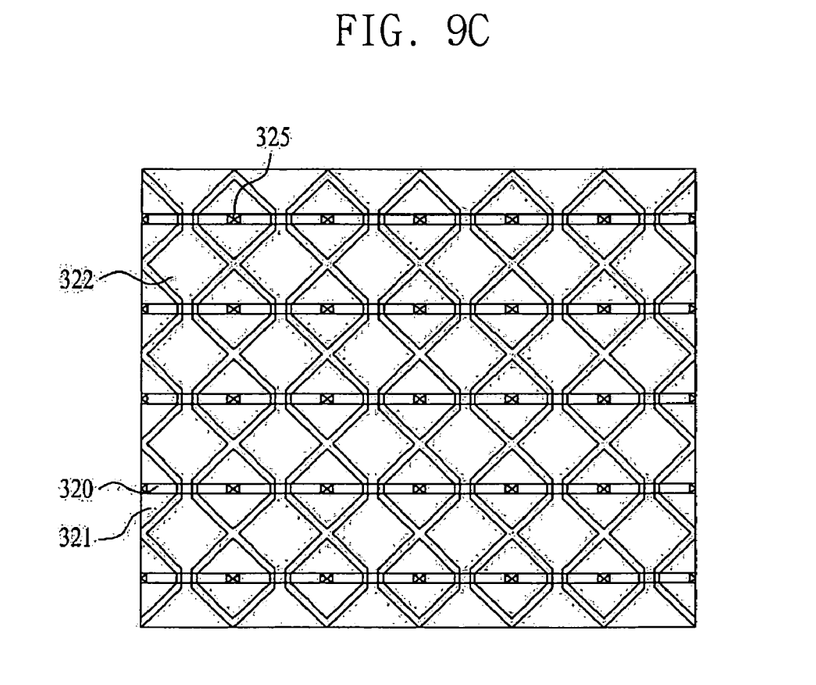
FIG. 9C is a plan view illustrating an embodiment of the present invention wherein diamond-shaped X and Y electrodes are arranged in the same layer in a manner similar to FIGS. 9A and 9B.

FIG. 9C is a plan view illustrating an embodiment wherein diamond-shaped X and Y electrodes are arranged in the same layer in a manner similar to FIGS. 9A and 9B.

Referring to FIG. 9C, first electrodes 321 in the form of diamond-shaped islands are arranged in a plurality of horizontal rows while being spaced apart from one another. Second electrodes 322 are arranged in a plurality of vertical columns while being continuously connected with one another. Each second electrode 322 generally has a diamond shape corresponding to the adjacent first electrodes 321 and all the second electrodes 322 are connected with one another via reduced-width portions defined at intersections with the first electrodes 321.

The first electrodes 321 and second electrodes 322 are formed to transparent electrodes in the same layer. Each second electrode 322 is provided at one end thereof with a pad electrode, to receive or detect signals. To electrically connect the first electrodes 321 of each row spaced apart from one another, a first electrode signal applying line 320 in the form of a horizontal line is provided per the row of the first electrodes 321. The first electrode signal applying line 320 may be located above or below the first and second electrodes 321 and 322 with a transparent insulating film interposed therebetween, and the transparent insulating film is perforated with contact holes 325 to connect the respective first electrodes 321 with the corresponding first electrode signal applying line 320.

Figure 10:
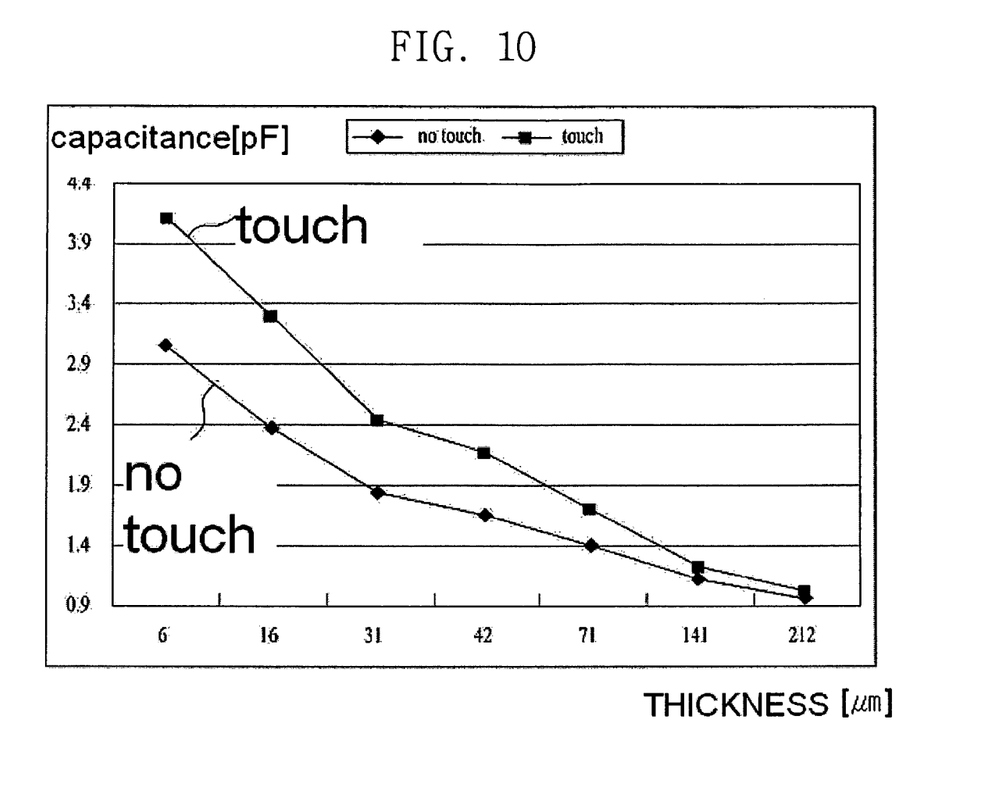
FIG. 10 is a graph illustrating a capacitance variation between X and Y electrodes according to the thickness of an insulating film between the two electrodes.

FIG. 10 is a graph illustrating a capacitance variation between an X electrode and a Y electrode according to the thickness of an insulating film between the two electrodes.

FIG. 10 illustrates a capacitance value that is variable according to the thickness of an insulating film between X and Y electrodes. It was observed that as the thickness of the insulating film was increased, differentiating between a touch state and a no-touch state became increasingly difficult. If the thickness of the insulating film excessively increases, there is a risk that a capacitance upon a no-touch state exceeds a capacitance upon a touch state. Accordingly, the thickness of the insulating film is determined within a range not causing the reversion of a capacitance.

A capacitance value at the intersection of X and Y electrodes was experimentally determined to about 50 femtofarads in consideration of line resistances of the X and Y electrodes. When the capacitance value varies, a touch is sensed. Explaining this with reference to numerical results of the graph, it can be appreciated that sensing of a capacitance value is effective when the thickness of the insulating film between the X and Y electrode is less than about 42 μm.

However, since it must be considered to reduce the overall thickness when being applied to products and the discrimination of a touch is possible only when a capacitance variation before or after a touch is more than a predetermined value, in the liquid crystal display device of the present invention, the thickness of the insulating film between the X and Y electrodes is determined to a range of approximately 0.1~5 μm.

The insulating film between the X and Y electrodes may be made of an organic insulating film such as photo-acryl, Benzo Cyclo Butene (BCB) or the like, or an inorganic insulating film such as a gate dielectric film or nitride film.

A liquid crystal panel 100 will be described in more detail with reference to FIG. 2

The liquid crystal panel 100 includes a first substrate 100, a second substrate 120, a thin film transistor array (not shown) formed on the first substrate 100, a color filter array (not shown) formed on the second substrate 120, a liquid crystal layer 130 filled between the thin film transistor array and the color filter array, and first and second polarizers 140a and 140b provided at the rear surfaces of the first and second substrates 110 and 120, respectively.

The thin film transistor array formed on the first substrate 110 may includes a plurality of gate lines (not shown) and data lines (not shown) intersecting each other to define pixel regions, pixel electrodes (not shown) formed in the respective pixel regions, and thin film transistors (not shown) formed at intersections of the gate lines and data lines.

The color filter array formed on the second substrate 120 may include a black matrix layer (not shown), a color filter layer (not shown) and an overcoat layer (not shown), which are sequentially formed on the second substrate 120, and a common electrode (not shown) formed over the entire surface of the overcoat layer.

In the above-described liquid crystal display device of the present invention, the touch sensor of the cover glass 200 is of a multi-touch type, wherein voltages are sequentially applied to the X electrodes of the respective horizontal rows and current values are sensed from the Y electrodes of the vertical columns, whereby the presence of a touch can be sensed from a variation in the sensed current value. In this case, the order of the X electrodes and Y electrodes may be changed, or any one of the X electrodes and Y electrodes may sense current values according to voltage application.

In the liquid crystal display device of the present invention, instead of separately fabricating a touch panel, the touch sensor is defined at the inner surface of the cover glass which is generally provided to protect the liquid crystal display device. This enables a reduction in the thickness of the entire liquid crystal display device module, and can reduce manufacturing costs because attachment of a touch panel is unnecessary.

Now, a driving method for sensing a touch will be described.

First, X electrodes (or first electrodes) as driving electrodes are sequentially scanned while voltages being applied in a pulse manner to the X electrodes. If the pulse voltages are applied to the X electrodes (first electrodes), a capacitance between the Y electrodes (or second electrodes) and the X electrodes (first electrodes) has a variation in the quantity of electric charges according to a voltage variation. The variation in the quantity of electric charges is measured from the Y electrodes (second electrodes). As a capacitance between the X electrodes (first electrodes) and the Y electrodes (second electrodes) is changed according to the presence of a touch, the variation in the quantity of electric charges is changed. Accordingly, the presence of a touch can be determined by detecting a difference in the variable quantity of electric charges.

As apparent from the above description, in a liquid crystal display device according to the present invention, if a cover glass is touched, a touch sensor of the cover glass having X and Y electrodes can sense the presence of a touch. Accordingly, it is unnecessary to provide a separate touch panel to a liquid crystal display device. Further, since the electrodes are formed only at one surface of the cover glass, the overall process can be simplified and the probability of misalignment between X electrodes and Y electrodes can be reduced. Also, according to embodiment, pad electrodes are formed at one surface of the cover glass where the touch sensor is defined (i.e. the surface where the X electrodes or Y electrodes are formed). This is advantageous in terms of bonding of the FPC touch signal applicator, etc. Furthermore, as a result of integrating a touch sensor in the cover glass rather than separately fabricating a touch panel, the use of glass that has been used to fabricate the touch panel can be eliminated, and attachment between the glass of the touch panel and the cover glass is unnecessary. This can eliminate unexpected costs due to attachment failures, etc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a liquid crystal panel including first and second substrates facing each other and a liquid crystal layer between the first and second substrates, each of the first and second substrates defining a central display region and a peripheral non-display region;
   a cover glass integrated touch sensor on the liquid crystal panel, the touch sensor including a plurality of transparent first electrodes and second electrodes formed on a surface of the cover glass facing the liquid crystal panel, wherein the first electrodes and second electrodes cross each other; and
   a touch signal applicator at a side of the cover glass away from the display region of the liquid crystal panel,
   wherein the cover glass protrudes from the liquid crystal panel, and the touch signal applicator is on a region of the cover glass protruding from the liquid crystal panel.

2. The device according to claim 1, wherein the first electrodes are bar-shaped electrodes elongated in an X-axis direction, and the second electrodes are bar-shaped electrodes elongated in a Y-axis direction to cross the first electrodes.

3. The device according to claim 2, wherein the first electrodes and second electrodes are arranged in different layers, and a transparent insulating film is an interlayer film between the first electrodes and the second electrodes.

4. The device according to claim 3, wherein the transparent insulating film has a thickness of approximately 0.1~5 μm.

5. The device according to claim 1, wherein:
   the plurality of first electrodes and second electrodes are spaced apart from each other on the cover glass;
   the first electrodes take the shape of islands spaced apart from one another in horizontal rows; and
   the second electrodes take the shape of bars extending in vertical columns.

6. The device according to claim 5, further comprising:
   a first electrode signal applying line above or below the first electrodes with a transparent insulating film interposed therebetween and used to apply signals to the first electrodes of each horizontal row, the first electrode signal applying line being electrically connected with the first electrodes through contact holes in the insulating film.

7. The device according to claim 6, wherein the liquid crystal panel further includes:
   a thin film transistor array on the first substrate and including gate lines and data lines intersecting each other to define pixel regions, thin film transistors at intersections of the gate lines and data lines, and pixel electrodes in the pixel regions; and a color filter array on the second substrate and including a black matrix layer corresponding to a region except for the pixel regions and a color filter layer corresponding to the pixel regions.

8. The device according to claim 7, wherein the first electrode signal applying line corresponds to the black matrix layer.

9. The device according to claim 1, wherein the first electrodes and second electrodes are made of any one of Indium Tin Oxide (ITO), Indium Zinc Oxide (IZO) and Indium Tin Zinc Oxide (ITZO).

10. The device according to claim 1, wherein the touch signal applicator is made of a Flexible Printed Cable (FPC) and is foldable to an underside of the liquid crystal panel.

11. The device according to claim 1, further comprising:
a voltage applying pad and a voltage detecting pad on the cover glass to correspond to the touch signal applicator and connected with the first and second electrodes of the touch sensor via connecting lines, respectively, the voltage applying pad applying voltage signals to the first electrodes, and the voltage detecting pad detecting signals output from the second electrodes,
wherein the voltage applying pad and voltage detecting pad are connected with the touch signal applicator via soldering.

12. A method of manufacturing a liquid crystal display device comprising:
forming a liquid crystal panel including first and second substrates facing each other and a liquid crystal layer between the first and second substrates, each of the first and second substrates defining a central display region and a peripheral non-display region;
forming a cover glass integrated touch sensor, the touch sensor including a plurality of transparent first electrodes and second electrodes on a surface of the cover glass facing the liquid crystal panel, wherein the first electrodes and second electrodes cross each other;
bonding the liquid crystal panel to the cover glass integrated touch sensor; and
forming a touch signal applicator at a side of the cover glass away from the display region of the liquid crystal panel,
wherein the cover glass protrudes from the liquid crystal panel, and the touch signal applicator is formed on a region of the cover glass protruding from the liquid crystal panel.

13. The method according to claim 12, wherein the first electrodes are bar-shaped electrodes elongated in an X-axis direction, and the second electrodes are bar-shaped electrodes elongated in a Y-axis direction to cross the first electrodes.

14. The method according to claim 13, wherein the first electrodes and second electrodes are arranged in different layers, and a transparent insulating film is an interlayer film formed between the first electrodes and the second electrodes.

15. The method according to claim 12, wherein:
the plurality of first electrodes and second electrodes are spaced apart from each other on the cover glass;
the first electrodes take the shapes of islands spaced apart from one another in horizontal rows; and
the second electrodes take the shape of bars extending in vertical columns.

16. The method according to claim 15, further comprising:
forming a first electrode signal applying line above or below the first electrodes with a transparent insulating film interposed therebetween and used to apply signals to the first electrodes of each horizontal row, the first electrode signal applying line being electrically connected with the first electrodes through contact holes in the insulating film.

17. The method according to claim 16, wherein forming the liquid crystal panel further includes:
forming a thin film transistor array on the first substrate and including forming gate lines and data lines intersecting each other to define pixel regions, forming thin film transistors at intersections of the gate lines and data lines, and forming pixel electrodes in the pixel regions; and
forming a color filter array on the second substrate and including forming a forming matrix layer corresponding to a region except for the pixel regions and a color filter layer corresponding to the pixel regions.

18. The method according to claim 17, wherein the first electrode signal applying line is formed to correspond to the black matrix layer.

19. The method according to claim 12, further comprising:
forming a voltage applying pad and a voltage detecting pad on the cover glass to correspond to the touch signal applicator and connected with the first and second electrodes of the touch sensor via connecting lines, respectively, the voltage applying pad applying voltage signals to the first electrodes, and the voltage detecting pad detecting signals output from the second electrodes and connecting the voltage applying pad and voltage detecting pad with the touch signal applicator via soldering.

20. The method of claim 12, wherein bonding the liquid crystal panel to the cover glass integrated touch sensor includes bonding to each other via an adhesive layer.

* * * * *